Figure 1:
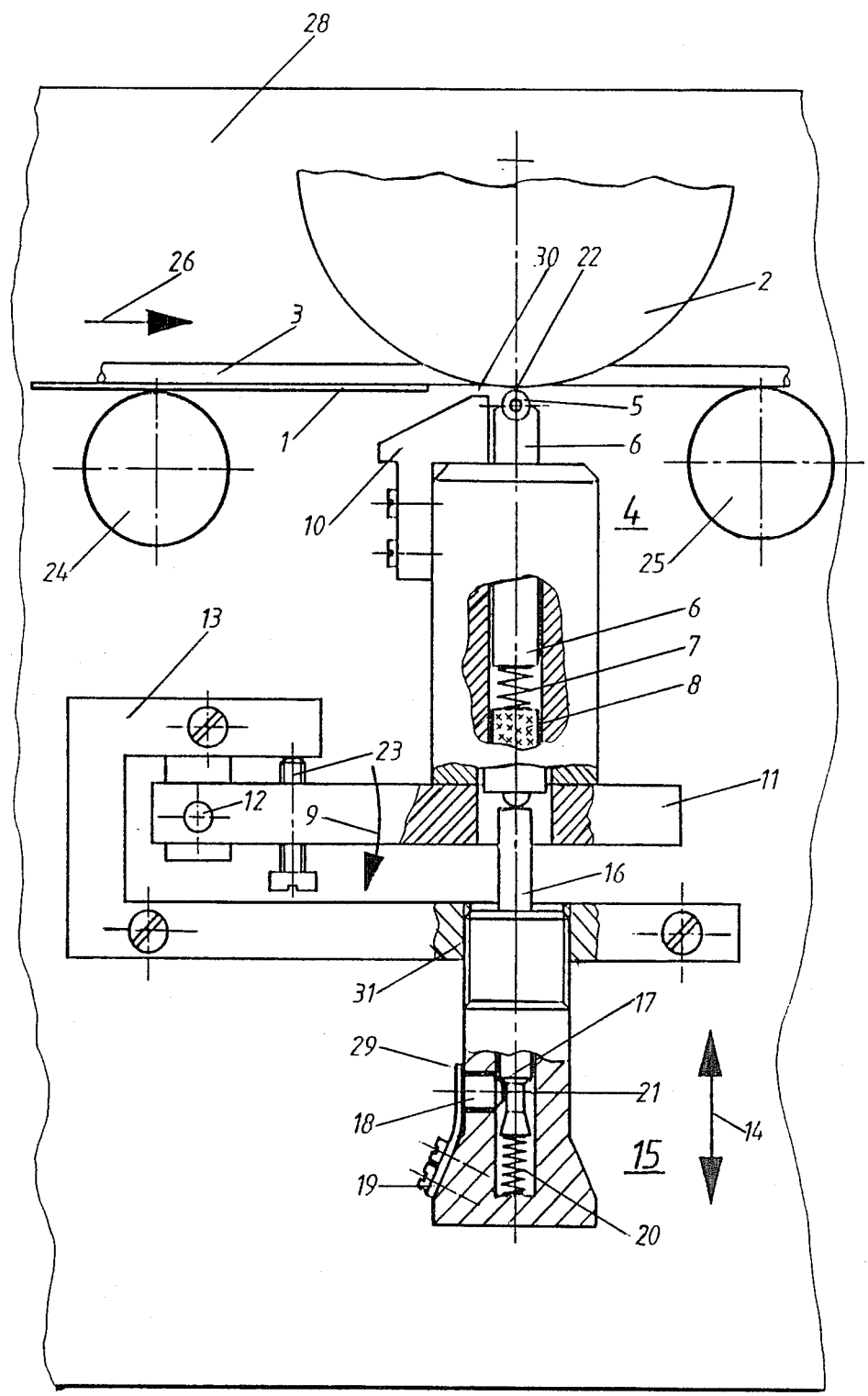

United States Patent [19]

Häusler

[11] Patent Number: 4,777,729

[45] Date of Patent: Oct. 18, 1988

[54] THICKNESS MEASURING APPARATUS FOR SHEET MATERIAL

[75] Inventor: August Häusler, München, Fed. Rep. of Germany

[73] Assignee: GAO Gesellschaft fur Automation und Organisation mbH, Munich, Fed. Rep. of Germany

[21] Appl. No.: 2,713

[22] PCT Filed: Apr. 19, 1985

[86] PCT No.: PCT/EP85/00178

§ 371 Date: Dec. 18, 1986

§ 102(e) Date: Dec. 18, 1986

[87] PCT Pub. No.: WO86/06471

PCT Pub. Date: Nov. 6, 1986

[51] Int. Cl.⁴ ............................................. G01B 21/08
[52] U.S. Cl. ............................... 33/147 L; 33/172 E; 271/263
[58] Field of Search ............. 33/147 B, 147 L, 147 N, 33/148 R, 148 H, 172 E; 271/262, 263

[56] References Cited

U.S. PATENT DOCUMENTS

| | | | |
|---|---|---|---|
| 2,503,720 | 4/1950 | Gieseke | 33/147 N |
| 2,841,876 | 7/1958 | Pittenger | |
| 3,354,273 | 11/1967 | Bleiman | |
| 4,068,385 | 1/1978 | Mitzel | 33/147 N |
| 4,073,488 | 2/1978 | Uchida | |

FOREIGN PATENT DOCUMENTS

| | | |
|---|---|---|
| 0478949 | 11/1976 | Australia . |
| 0230108 | 11/1963 | Austria . |
| 0025976 | 4/1981 | European Pat. Off. . |
| 0354540 | 12/1920 | Fed. Rep. of Germany . |
| 2137269 | 2/1973 | Fed. Rep. of Germany . |
| 3039532 | 5/1982 | Fed. Rep. of Germany . |
| 3221379 | 12/1983 | Fed. Rep. of Germany . |
| 2318401 | 2/1977 | France . |
| 1094863 | 12/1967 | United Kingdom . |

Primary Examiner—Harry N. Haroian
Attorney, Agent, or Firm—Sandler & Greenblum

[57] ABSTRACT

A thickness measuring apparatus for sheet material has before the actual measuring gap a pretest sensing element which responds to overthicknesses in the material under test transported to the apparatus and, if necessary, swivels the measuring system out of the plane of transport. This avoids jamming in the transport system and damage to or maladjustment of the measuring system. A triggering mechanism which cooperates with the pretest sensing element can be designed in such a way that the measuring system is swiveled away only in the case of a definite adjustable force. After a disturbance the measuring system is automatically returned to the original position.

14 Claims, 2 Drawing Sheets

THICKNESS MEASURING APPARATUS FOR SHEET MATERIAL

The present invention relates to an apparatus for the contacting measurement of differences in thickness of sheet material which is supplied to the apparatus with the aid of a transport system, comprising a measuring gap provided on the plane of transport and formed by an abutment disposed rigidly with respect to the measuring gap, and a first sensing element capable of being deflected respect to the measuring gap perpendicular to the sheet material.

German Pat. No. 31 33 818 discloses a thickness measuring apparatus for mechanically measuring the thickness of chip boards. Differences in the thickness of the material under test are measured in a measuring gap between a sensor in the form of a sensing roller and a rigid plate support.

In this apparatus the sensing roller is connected with a rod which is disposed in a first cylinder-piston assembly (measurement cylinder) so as to be movable up and down. The geometry of the measuring cylinder is such that the piston can absorb the measuring displacement by means of an air cushion. A second cylinder-piston assembly (adjustment cylinder) is coupled with the first in mechanically rigid fashion and has the function of performing the null balance of the apparatus, or adjusting the measuring system to the thickness "d" to be expected for the material under test.

During the thickness measurement the pressure is very high in the adjustment cylinder compared with that in the measurement cylinder so that the differences in thickness arising due to the material under test can be picked up by the measurement cylinder in the tolerance range $d \pm \Delta d$ without being affected by movements of the adjustment cylinder. If overthicknesses occur in the measuring gap which exceed the tolerances of $\pm \Delta d$, the permissible working range is exceeded in the measurement cylinder and the forces caused by the overthickness are transfered to the cylinder-piston assembly, which is now acting as a rigid abutment. Since no measures are provided for protecting the thickness measuring apparatus from overthicknesses, this necessarily leads to the measuring system being damaged or maladjusted.

It is basically conceivable to use a thickness measuring apparatus which functions according to the above-described principle for automatic bank note sorters as well.

When used for this purpose, however, the contacting thickness measurement is problematic since the necessary measuring speeds are much higher and the material under test is transported in a much faster sequence through the measuring apparatus and the differences in thickness to be measured are much smaller. Sheets which are folded or lie on top of each other or even foreign bodies such as paper clips or the like can in practice not be prevented from passing through the thickness measuring apparatus. These abnormal cases sometimes have a thickness many times greater than the "standard thickness." They easily lead to jamming in the transport system and to the measuring system being damaged or maladjusted. Since such disturbances usually have to be eliminated manually, the throughput of the voucher sorter may be very greatly reduced.

The invention is therefore based on the problem of proposing an apparatus for the contacting measurement of differences in thickness of sheet material, which avoids the above-mentioned disadvantages.

This problem is solved according to the invention by the features stated in the characterizing part of the main claim.

The basic idea of the invention is to provide in front of the actual measuring gap a pretest sensing element which preferably forms together with the abutment of the first sensing element a pretest measuring gap, the pretest sensing element responding to overthicknesses in the arriving material under test and, if necessary, swiveling the measuring system out of the plane of transport. The pretest sensing element, which detects the overthickness and is itself insensitive to mechanical action, picks up the forces arising due to overthicknesses and uses them to swivel away the measuring system, thereby avoiding jamming in the transport system as well as damage to and maladjustment of the measuring system. An abutment which cooperates with the sensing elements is preferably a steel roll which is at the same time an element of the transport system.

According to an advantageous development of the invention, the measuring device is only caused to swivel away when a definite adjustable force acts on the pretest sensing element. For this purpose, the pretest sensing element is connected to a triggering mechanism which rigidly couples the measuring system in the permissible working range with the steel roll forming the abutment. The function of the second abutment is discontinued when the force acting on the pretest sensing element exceeds the predetermined force adjusted at the triggering mechanism. The triggering mechanism is preferably designed in such a way that the measuring system is automatically returned to its original position as soon as the overthickness causing the deflection has passed the measuring system. This makes it unnecessary to intervene manually to remove disturbances.

Figure 2:
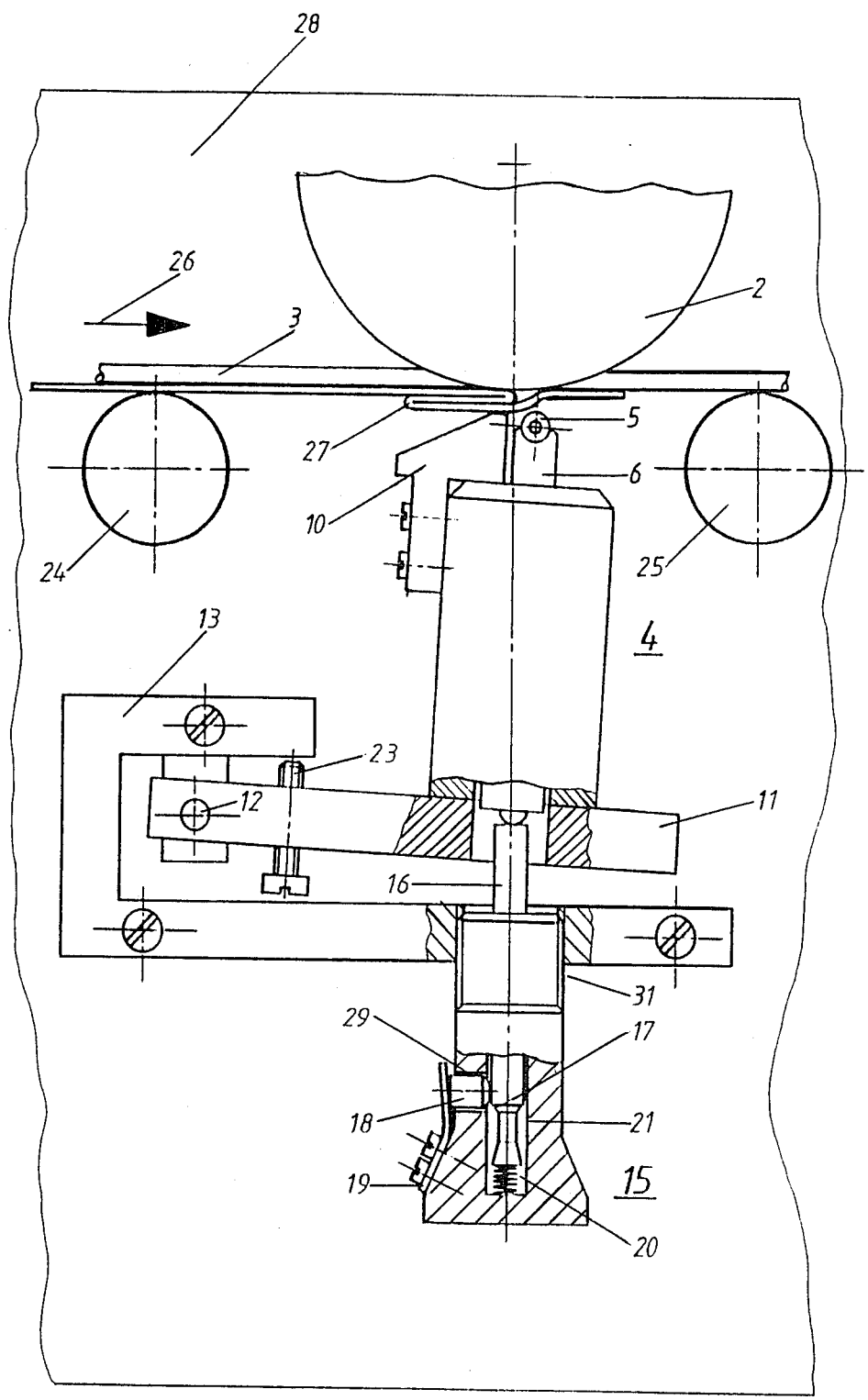

Further advantages and developments of the invention can be found in the subclaims and in the following description of an embodiment of the invention with reference to the adjoined drawing, in which FIG. 1 shows a thickness measuring apparatus in the measuring position for measuring differences in thickness of sheet material, and FIG. 2 shows the protected position of the thickness measuring apparatus in the presence of sheet material which is too thick.

FIG. 1 shows an exemplary embodiment of a thickness measuring apparatus according to the invention. The essential elements of the apparatus are measuring means 4, triggering means 15, transport system 24, 25, 3 with integrated abutment 2 and pretest sensing element 10.

Measuring means 4 itself works fundamentally in the way described above in connection with German Pat. No. 31 33 818. Differences in thickness in the material under test—for example in the area of the watermark in the case of bank notes—thus effect against a rigid abutment the mechanical deflection of a sensing element lying resiliently at right angles to the material under test. In the measuring system the change of path is converted directly or indirectly into electrical signals proportional to the thickness of the material under test. As shown in FIG. 1, measuring means 4 is connected via a lever 11 with a mounting means 13 in a fulcrum 12 in such a way as to be pivotable, as indicated by arow 9, about this fulcrum. Mounting means 13 is screwed onto a base plate 28 and also serves to take up triggering means 15. The triggering means is axially displaceable in the mounting means in accordance with arrow 14 shown in FIG. 1 and can be fixed in any desired position in mounting means 13. A steel roll 2 is pivoted on base plate 28 as an abutment for measuring means 4. The steel roll is also a functional element of the transport system shown only schematically in FIG. 1 and comprising belt 3 and transport rollers 24, 25. In the direction of transport—characterized by arrow 26—before the measuring means there is pretest sensing element 10 designed as a guide. Said element 10 is rigidly connected with measuring means 4 and lever 11, forms with steel roll 2 pretest measuring gap 30 and, as shall be explained below, cooperates via lever 11 with triggering means 15.

An essential element of the measuring means is sensing or measuring roller 5, which is connected with a plunger 6. The plunger is mounted so as to be axially movable in measuring means 4 and is connected via a spring 7 with an element 8 which picks up the force produced by the plunger movement due to changes of thickness in the material under test and acting on the spring, and converts it into an electrical signal. The transducer used may be, for example, a piezocrystal element (e.g. quartz crystal transducer of the Kistler company, Type 9203). Measuring roller 5 of measuring means 4 forms together with steel roll 2 of the transport system measuring gap 22 which the material under test passes in the direction of arrow 26, as shown in FIG. 1. The adjustment of the measuring gap between roll 2 and measuring roller 5 is performed by a stop screw 23 provided in lever 11, said screw being adjustable against mounting means 13. By turning stop screw 23 the measuring gap is adjusted in such a way that even the thinnest point to be expected in the material under test provides an electrical signal on the piezocrystal which can be readily evaluated. When measuring gap 22 is adjusted, measuring gap 30 of pretest sensing element 10 is also adjusted in the embodiment shown, since this element is rigidly connected with the measuring means. Element 10 is mounted on the measuring means in such a way that material under test 1 can pass pretest measuring gap 30 in the intended working range virtually without contact. Stop screw 23 is used to fix measuring roller 5 and pretest sensing element 10 in a definite position in the direction of the transport system against steel roll 2. They are fixed in the opposite direction by triggering means 15.

Triggering means 15, as shown in two different working phases in FIGS. 1 and 2, basically comprises two plungers 16, 18 which are each mounted movably in a bore 21, 29 in means 15. While plunger 16, which is mechanically coupled with measuring means 4, or pretest sensing element 10, and referred to in the following as the "push plunger," is disposed movably in a first bore 21 in the means, the second plunger 18, referred to the following as the "block plunger," slides in a bore 29 disposed at right angles to the first bore. Push plunger 16 has at the end located in bore 21 a notch 17 with which block plunger 18 engages and in which it is held with the aid of a spring 19, for example a plate spring.

FIG. 1 shows triggering means 15 in the blocked state. Up to a definite adjustable value the position of the block plunger in bore 29 in the means remains unchanged when a force acts on push plunger 16. The blocking or triggering force is essentially dependent on the flank inclination angle of notch 17, the adhesive friction and spring force 19 which acts on the block plunger. If the force exerted by the material under test on the push plunger exceeds the triggering force, block plunger 18 is pressed out of notch 17 in bore 29 against the force of plate spring 19. When block plunger 18 has been pressed out of notch 17 it slides on the surface area of the push plunger (see FIG. 2). As soon as the force exerted by the material under test on the push plunger disappears, this plunger is pressed back into its starting position, i.e. the blocked position, with the help of a spring 20 disposed in bore 21. The time required by push plunger 16 to pass from the blocked state to the released state (triggering time) is primarily dependent on the path block plunger 18 follows on the flank length of notch 17 to arrive at the push plunger from the notch. Further parameters are the spring force of spring 19 loading the push plunger, and frictional forces. The triggering time may be adapted to the given conditions by appropriately designing the effective flank length and the spring force. Finally, the time required by the push plunger to return to its starting position is dependent on the force of spring 20 and the friction of all the apparatus elements cooperating during this process. As one can see, all functional parameters of the triggering means are adjustable in a simple manner independently of each other, thereby allowing for the apparatus to be adapted optimally to the particular situation.

After measuring gap 22 has been adjusted to the thickness to be measured for the material under test with the aid of stop screw 23, as described above, triggering means 15 is rotated into corresponding thread 31 of frame 13 far enough for push plunger 16 just to touch measuring means 4 on the side opposite measuring roller 5 free from play. Thus, measuring means 4 and pretest sensing element 10 are connected more or less rigidly to holding means 13 mounted on base plate 23 and thus also to steel roll 2 by stop screw 23, on the one hand, and by triggering means 15, on the other hand.

Now that the various functional elements have been explained, the behavior of the apparatus in measuring operation and when a disturbance occurs shall be described in the following.

The displacements of measuring roller 5 arising due to the differences in thickness of sheet material 1 are converted by the measuring means into voltages proportional to the paper thickness (FIG. 1). The triggering force of triggering means 15 is adjusted in such a way that the forces arising due to the measuring displacement do not suffice to neutralize the blocking effect, so that the triggering means acts as a rigid abutment in the working range of the measuring means. This rigid coupling of the measuring means allows for the detection and evaluation of very small displacements such as occur, for example, when the water mark of a bank note is tested. FIG. 2 shows the situation when a disturbance occurs, for example when a bank note with a Z fold 27 arrives. Since this Z fold in the bank note constitutes an overthickness with respect to the adjusted pretest measuring gap 30, a force acts on pretest sensing element 10 against rigid roll 2 which is transfered via the housing of measuring means 4 to push plunger 16 and triggering means 15. The blocking force of triggering means 15 is adjusted in such a way, for example, that the blocking effect is neutralized when a force acts on the pretest sensing element which is greater than that produced by an overthickness of 50% of the material under test. If the blocking force is exceeded, as is the case with a Z fold, measuring means 4 swivels together with pretest sensing element 10 about fulcrum 12 of lever 11 out of the plane of transport. In this phase the contact of measuring roller 5 with material under test 1 is avoided in order to prevent the measuring system from being damaged. Only the force produced by spring 20 is now acting on the assembly swiveled out of the plane of transport, allowing for the assembly to be returned to the starting position when measuring gap 22, 30 is released. The force of spring 20 may be adjusted so as to be very much smaller than the blocking force required to overcome the overthickness. This means that after the blocking force is overcome the overthickness is not pressed on with great force when passing through the pretest measuring gap. This reduces the danger of jamming in the path of transport. The triggering time of the blocking effect, the definition of which was explained above, is selected so as to be very short, thereby providing additional effective protection against jamming and the measuring system being damaged or maladjusted. The restoring time of the apparatus can be adjusted with the force of spring 20 so as to be long enough for the measuring assembly to return to its starting position only when an overthickness has been transported completely past, but short enough for it to be available again for testing the next material under test.

Summing up it may be said that the apparatus described by way of example ensures the reliable and precise testing of thickness even in the case of small displacements, that swiveling the measuring means out of the plane of transport when an overthickness occurs prevents jamming in the path of transport and protects the measuring system against damage or maladjustment, and in the case of a disturbance no manual intervention is required to eliminate it since the original measuring situation is automatically restored.

I claim:

1. An apparatus for measuring the thickness of a sheet, said apparatus comprising
   (a) an abutment;
   (b) a first sensing element for measuring the thickness of a sheet moving on a path between said abutment and said first sensing element, said first sensing element being adapted for deflection from said path;
   (c) a second sensing element, associated with and positioned upstream of said first sensing element, said second sensing element being adapted for deflection from said path by a thickness of sheet greater than a predetermined thickness, so that, upon deflection of said second sensing element by said thickness of sheet greater than said predetermined thickness, both said first sensing element and second sensing element are deflected from said path.

2. The apparatus as defined by claim 1, wherein:
   (a) said path is a plane;
   (b) said first sensing element is deflectable perpendicularly to said plane, is impelled by a pressure toward said path, and, prior to deflection, is spaced from said abutment by a first distance;
   (c) said second sensing element, prior to deflection by said thickness of sheet greater than said predetermined distance, is spaced from said abutment by a second distance equalling said predetermined thickness; and
   (d) upon deflection of said second sensing element, by said thickness of sheet greater than said predetermined thickness, said pressure impelling first sensing element toward said path is reduced.

3. The apparatus as defined by claim 2 wherein, after said thickness of sheet greater than said predetermined distance is downstream of said first detection means, said pressure upon said first sensing element is resumed, and said second sensing element is returned toward said plane until said second sensing element is spaced from said abutment by said second distance.

4. The apparatus as defined by claim 2 wherein said first and second sensing elements are mechanically coupled.

5. The apparatus as defined by claim 4 wherein said first and second sensing elements are swivelled away from said plane by a lever mounted on a fulcrum.

6. The apparatus as defined by claim 2 wherein said second sensing element is associated with a triggering means exerting a blocking force which opposes deflection of said second sensing element, said triggering means being triggered, by a deflecting force opposing and exceeding said blocking force, to allow said first and second sensing elements to be deflected from said plane.

7. The apparatus as defined by claim 6 wherein said triggering means, upon being triggered, exerts a pushing force against said first and second sensing elements in the direction of said plane, said pushing force being less than said blocking force.

8. The apparatus as defined by claim 6 wherein said triggering means comprises:
   (a) a push plunger provided with a notch and slidably mounted in a first bore; and
   (b) a block plunger slidably mounted in a second bore and situated perpendicularly to said push plunger, said block plunger being biased by a first spring against said push plunger.

9. The apparatus as defined by claim 8 wherein, when said triggering means is not triggered, said block plunger rests in said notch in a blocking position.

10. The apparatus as defined by claim 9 wherein, when said triggering means is triggered, said block plunger slides out of said notch into a releasing position.

11. The apparatus as defined by claim 10, wherein, when said blocking plunger is in said releasing position, said push plunger is pressed against a second spring, said second spring biasing said push plunger toward said plane.

12. The apparatus as defined by claim 10 wherein the degree of said blocking force exerted by said triggering means is determined by the angle of inclination of said notch, by the force exerted by said first spring, and by the friction resulting from the interaction of said fulcrum, push plunger, notch, block plunger, and first and second bores.

13. The apparatus as defined by claim 10 wherein the time required for said block plunger to slide from said blocking position to said releasing position depends upon the path said block plunger follows along said notch.

14. The apparatus as defined by claim 10 wherein the time required for said block plunger to slide from said releasing position to said blocking position depends upon the force exerted by said second spring.

* * * * *